United States Patent [19]

Chan

[11] 4,299,465
[45] Nov. 10, 1981

[54] RETRACTABLE CAMERA

[75] Inventor: Kwok Y. Chan, Hong Kong, Hong Kong

[73] Assignee: W. Haking Enterprises, Ltd., Hong Kong, Hong Kong

[21] Appl. No.: 957,154

[22] Filed: Nov. 2, 1978

[51] Int. Cl.³ .................. G03B 15/05; G03B 17/04
[52] U.S. Cl. .............................. 354/145; 354/187; 354/288
[58] Field of Search ............. 354/126, 145, 158, 187, 354/204, 212, 288; D16/6

[56] References Cited
U.S. PATENT DOCUMENTS

| D. 238,613 | 1/1976  | Waaske ........................... D16/6 |
| 3,857,667  | 12/1974 | Vetere ........................... 362/11 X |
| 3,938,170  | 2/1976  | Winkler et al. ................. 354/288 |
| 3,950,771  | 4/1976  | Winkler ........................ 354/187 |
| 3,988,752  | 10/1976 | Winkler et al. ................. 354/187 X |
| 4,032,940  | 6/1977  | Chan ............................. 354/288 X |
| 4,100,554  | 7/1978  | Iijima .......................... 354/145 |
| 4,132,471  | 1/1979  | Svatek et al. ................. 354/126 X |

FOREIGN PATENT DOCUMENTS

| 1230663 | 12/1966 | Fed. Rep. of Germany ...... 354/288 |
| 2639443 | 3/1978  | Fed. Rep. of Germany ...... 354/145 |
| 1404702 | 9/1975  | United Kingdom .............. 354/187 |

Primary Examiner—L. T. Hix
Assistant Examiner—Thomas H. Tarcza

[57] ABSTRACT

A preferably pocket-sized camera has its horizontal dimension parallel to its front lens window-containing wall minimized by constructing the camera housing in two sections which are relatively movable in a direction parallel to the front wall between relatively retracted positions where all lens windows are covered and extended picture-taking positions which preferably effects film winding and shutter cocking. One of the housing sections includes most of the components of a still camera except for the flash lamp portion thereof, and the other housing section carries an electronic flash lamp associated with a lamp energizing circuit with a capacitor charging portion preferably contained in the main housing section, except for the battery for energizing this circuit which is preferably carried by the flash lamp carrying housing section. The charging of a capacitor in the capacitor charging portion takes place when the two housing sections are moved to their relatively extended positions and a flash on-off switch is in the "on" position, and the charging circuit is deenergized automatically when the housing sections are in their relatively retracted positions even when this switch is left in its "on" position. A cartridge-receiving compartment is preferably located at the bottom portion of the main housing section, and at least part of the flash lamp on the other housing section overlies a part of this compartment when the camera sections are in their relative retracted positions, and is moved well beyond this compartment when the housing sections are in their extended positions.

7 Claims, 8 Drawing Figures

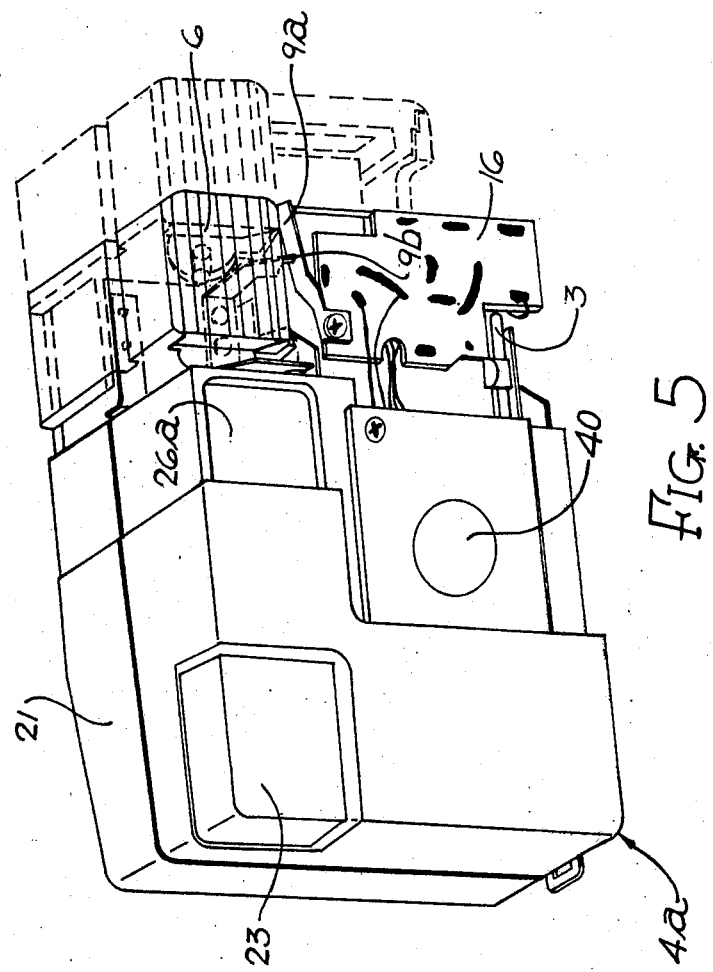

RETRACTABLE CAMERA

BACKGROUND OF THE INVENTION

This invention relates to still cameras, and while some aspects of the invention have a more general application, it is most useful in pocket-sized cameras designed to receive 110 sized film cartridges which heretofore have had a very narrow elongated profile. All of such prior art cameras on the market have housings with a very short vertical dimension, where the cartridge-receiving compartments exposable at the rear of the camera housing spans substantially the entire vertical interior dimension of the housing. The viewfinder section of the camera, which also occupies substantially the entire vertical dimension of the camera, is located beyond one end of the film cartridge-receiving compartment. When a built-in electronic flash lamp is incorporated in the camera, the flash lamp and battery compartment is generally positioned adjacent to the opposite end of the cartridge-receiving compartment where it substantially increases the camera length in a horizontal direction parallel to the front wall of the camera, so that the camera becomes quite bulky and uncomfortable to hold in a pocket of the user's clothing.

The length of such a camera has been materially reduced by the camera construction shown in U.S. Pat. No. 4,032,940, granted June 28, 1977. This camera has a housing constructed in two relatively horizontally telescoping sections. One of the camera sections is a main housing section including substantially all of the components of a still camera except for the viewfinder portion thereof. The other section of the camera has a housing which interfits with the housing of the main camera sections so in its retracted position the front and rear viewfinding lens elements thereof interleave with elements of the main camera housing. When the viewfinder section is in its extended position, the front and rear viewfinder lens elements are unobstructed. In the retracted position of the viewfinder section, a part thereof covers the objective lens and shutter release member in the main section of the camera, and wall elements of the main camera section cover over the viewfinder lens elements. The movable viewfinder carrying section is provided with means for cocking the shutter operating mechanism of the camera and removing a film perforation sensing finger as it is moved to its retracted position and means for effecting a film advancing operation when the viewfinder section is moved to its extended position.

While the camera disclosed in this patent is adapted to receive a flash cube in the top wall thereof, a similar retractable camera is being marketed where an electronic built-in flash lamp is provided by extending the length of the main camera section and placing the built-in electronic flash lamp, battery compartment and energizing circuits therefor in such housing extension. In such case, the fixed distance between the flash lamp and the objective lens must be sufficiently great to prevent "pink-eye" effects where the eyes of persons in close-up shots become unnaturally pink. As is conventional in cameras with built-in electronic flash lamps, the energizing circuits for such lamps generally includes a capacitor with a charge circuit therefor which maintains the capacitor in a charged condition when a flash on-off switch is positioned in its "on" position. The battery used in such cameras for charging the capacitor is undesirably slowly discharged when the flash on-off switch is inadvertently left in its "on" condition when the camera is not in use.

One of the objects of the invention is to provide a unique camera construction, most preferably one for receiving 110 film cartriges, which includes a built-in electronic flash lamp, and wherein the length of the camera is materially reduced even from that found in said retractable cameras with a built-in electronic flash lamp, so that the camera fits more easily in the user's pocket, handbag or other storage area of limited size. A related object of the invention is to provide a camera as described which has relatively retractable and extendable camera housing sections with a unique arrangement and relationship of the parts thereof to obtain such a reduced length. A further object of the invention is to provide a camera with a built-in electronic flash lamp, and having relatively retractable and extendable sections thereof, and wherein means are provided for minimizing the aforesaid undesired discharge of the flash lamp circuit charging battery when the user inadvertently leaves the flash on-off switch in its "on" position.

SUMMARY OF THE INVENTION

In accordance with one of the features of the invention, a still camera is provided having two housing sections which, when held in a normal picture-taking position, comprises two sections movable horizontally between relatively retracted and extended positions. In the retracted positions of these housing sections the viewfinder and objective lens openings are covered to prevent accumulation of dust thereon. One of the camera sections, referred to as the main housing section, contains the objective lens and the other section of the housing contains a built-in electronic flash lamp with its diffuser exposed at the front of the camera section. When the built-in flash lamp carrying section of the camera is moved horizontally into its extended position relative to the other section of the housing, the aforementioned viewfinder and objective lens openings become exposed and the camera is in a picture-taking position where the flash lamp is located a maximum distance from the objective lens. This maximum space between the built-in flash lamp and the objective lens reduces or eliminates "pink-eye" affects which occur in taking close-up pictures of people and animals when the spacing between the flash lamp and objective lens is less than a given desired distance as, for example, $2\frac{1}{2}''$. The movement of the camera sections between their relative retracted and extended positions preferably effects film winding shutter cocking and film perforation sensing finger withdrawal operations. Thus, the present invention differs from the heretofore made retractable camera with built-in electronic flash lamp above described in that the flash lamp, and also preferably the battery for charging the capacitor which discharges through the lamp when a picture is taken when a flash operation is called for, is located on the housing section movable on the main housing section containing the objective lens and the film cartridge compartment behind the lens. Accordingly, the spacing between the flash lamp and objective lens in the unuseable retracted position of the housing sections can be less than that present during the extended picture taking positions thereof which avoids "pink-eye" effects. (Also, in accordance with this aspect of the invention, the viewfinder is preferably mounted on the main housing section.) While cameras have heretofore mounted a built-in electronic flash lamp per se in 126 film cartridge-receiving cameras for movement between retracted and extended positions, each such flash lamp was not, as in the most advantageous form of the invention, part of a housing section forming an entire end section of a camera housing where this housing section and the main housing section are grasped in opposite hands during a picture taking operation, after which their reciprocation back and forth effects film winding and shutter cocking operations. Rather, these prior flash lamp supports were small units mounted in recesses in the top walls of these cameras and were raised into operating position during a picture taking operation and performed no such operations.

Another feature of the invention to minimize the length of horizontal dimension of the camera in a plane parallel to the front face of the camera is the provision of a unique spacial relationship between the electronic built-in flash lamp, the objective lens, viewfinder and the film cartridge-receiving compartment of a camera designed to receive 110 film cartridges. Thus, as previously indicated, because of the thin elongated shape of 110 film cartridges it has been conventional until now to place the built-in electronic flash unit in general horizontal alignment with the objective lens and viewfinder windows which make the camera especially long in the camera's operative position even for retractable cameras. Accordingly, instead of designing the camera so that the thin dimension is the vertical dimension of the camera, the 110 film cartridge-receiving camera now being described is designed so that the thin dimension of the camera extends forwardly and horizontal, analagous in some respects to the cameras designed to receive a 126 film cartridge, which is a relatively wide film cartridge which is not suitable to the thin horizontally elongated profile of the conventional cameras adapted to receive 110 film cartridges. Thus, in this aspect of the invention, the front and rear profile of the camera occupied an appreciable area to accommodate the objective lens preferably located in the bottom half of the camera and the viewfinder lens and built-in electronic flash lamp and diffuser preferably located in the upper half of the camera where part of the same overlies an end of the film cartridge-receiving compartment. The horizontal dimension of the camera thus need not accommodate the combined widths of the film cartridge-receiving compartment, the viewfinder, and the electronic flash lamp with its battery compartment and charge circuit in the operative condition of the cameras, as did the aforesaid retractable camera with a built-in electronic flash lamp.

In accordance with still another feature of the invention, in a camera of the retractable type wherein the camera has housing sections movable horizontally between retracted and extended picture-taking positions, means are provided for respectively enabling and disabling the charge circuit of the capacitor in the energizing circuit of a built-in electronic flash lamp when the camera sections are respectively in their extended and retracted positions. Since the user will normally move the camera sections to their retracted position for normal storage of the camera, the failure of the user to move the manually operable flash on-off switch to "off" condition after taking a picture will not result in undesired discharge of the battery which supplies power to the capacitor charging circuit in the present invention.

The above and other objects, advantages and features of the invention will become apparent upon making reference to the specification to follow and the claims.

DESCRIPTION OF DRAWINGS

FIG. 5 is a perspective view of the front of the camera when the housing sections thereof are in their retracted positions, and further wherein portions of the housing walls are removed to expose the interior of the camera housing;

DESCRIPTION OF EXEMPLARY EMBODIMENT OF THE INVENTION

Figure 1:
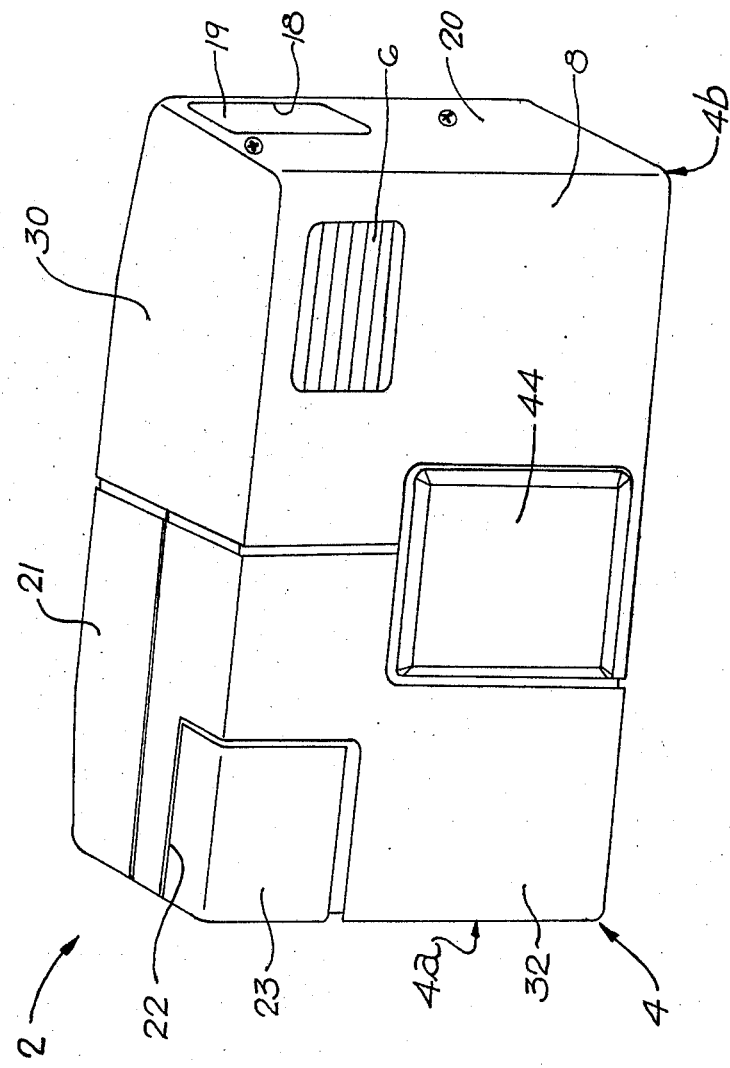
FIG. 1 is a perspective view of the front of a preferred retractable camera of the present invention when the housing sections thereof are in their relative retracted positions.

Referring now to the drawings, the retractable camera there shown and identified by reference numeral 2 includes a housing 4 comprising a main housing section 4a, which preferably contains practically all of the operating components of a conventional still camera except for the flash lamp portion thereof, and a flash lamp-carrying housing section 4b. The latter housing section is mounted on one end of the main housing section 4a for horizontal movement in a direction parallel to the front of the housing assembly between retracted and extended positions. The outward extent of movement of the flash lamp-carrying housing section 4b may be limited in any suitable way, as by providing a suitable stop on a slide support structure. The slide support structure for the housing sections may include one or more guide rods 3 (FIG. 5) extending longitudinally and horizontally from one of the housing sections and slidably receiving a surrounding portion (not shown) on the other of same. The aforementioned stop may be a suitable stop shoulder on a guide rod.

Figure 7:
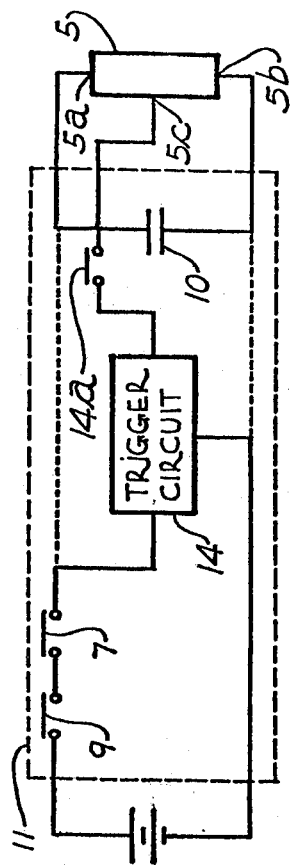
FIG. 7 is a partially block and partially circuit diagram of the energizing circuit for the built-in flash lamp carried by the housing section shown in FIG. 8.
Figure 6:
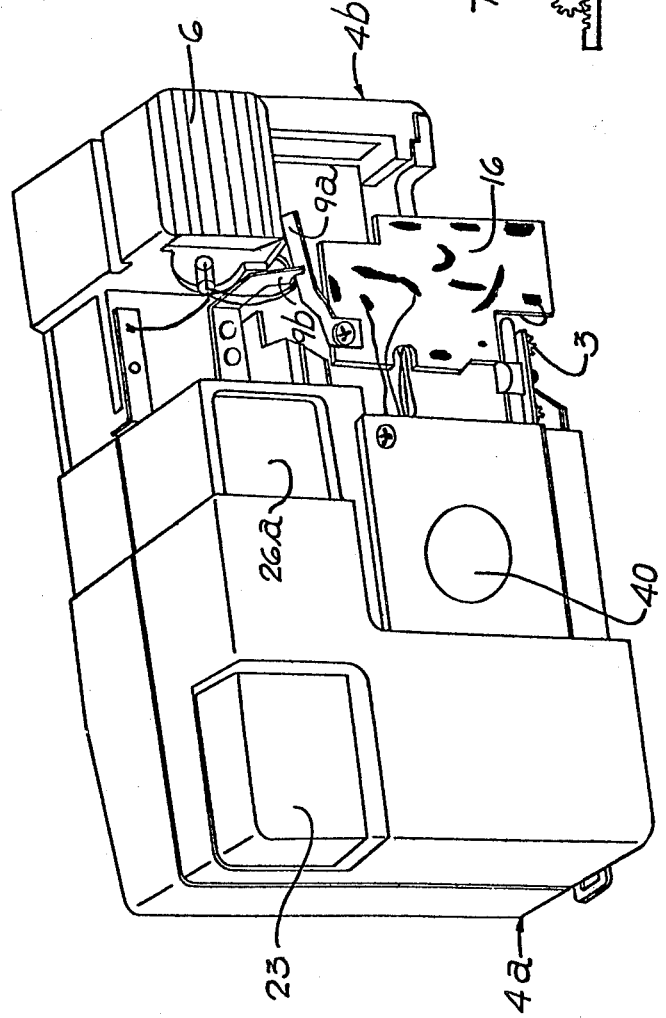
FIG. 6 is a perspective view corresponding to FIG. 6 with the housing sections in their extended positions.

In the preferred form of the invention, the flash lamp-carrying housing section 4b carries a built-in electronic flash lamp, although some aspects of the invention are useful also with a camera that receives the different types of flash lamp units which plug into sockets in the camera housing. An electronic flash lamp generally includes a gas-filled tube 5 (FIG. 7) with D.C. input terminals 5a–5b and a trigger pulse input terminal 5c. Such a tube is mounted in the housing section 4b behind a light-diffusing window 6 mounted in an opening in the front wall 8 of the housing section 4b. The electronic flash lamp terminals 5a–5b are connected across a capacitor 10 energized by an energizing and trigger pulse generating circuit 11 including series connected switches 7 and 9 connecting a battery 12 to capacitor 10, and a trigger pulse generating portion 14. When switches 7 and 9 are closed, capacitor 10 fully charges. The capacitor 10 discharges through the flash lamp tube 5 when a trigger pulse is generated during a flash picture taking operation which closes trigger contacts 14a as the camera shutter opens. The trigger contacts 14a are connected between the trigger pulse generating portion 14 and the trigger input terminal 5c. The circuit components of the trigger pulse generating portion 14 and the capacitor 10 are supported on a circuit board 16 preferably mounted within main housing section 4a, as shown in FIGS. 5 and 6. In the preferred form of the invention, the battery 12 is supported within a battery compartment provided in the flash lamp-carrying housing section 4b and opening at 18 (FIG. 1) onto an outer end wall 20 thereof. This end wall opening is closed by a spring-mounted slidable door 19.

The housing sections 4a and 4b most preferably form a generally overall rectangular box-like housing having a relatively thin horizontal front to back dimension and front and rear vertical profiles of sufficient height and width to accommodate the placement of the various elements of the camera in both horizontally and vertically spaced relation. The main housing section 4a has a main top wall portion 21 having a cut-out portion 22 for receiving the upper wall portion of a shutter-operating pushbutton 23. The main top wall portion 21 joins a slightly depressed top wall portion 24 (FIG. 2) which is preferably located above the viewfinder portion 26 of the camera located in the central upper portion of the camera but near the inner-end margin of the upper portion of the housing section 4a. The flash lamp-carrying housing section 4b has a top wall 30 which is disposed for horizontal movement above the recessed wall portion 24. In the fully retracted portion of the lamp-carrying housing section 4b, the inner edge 30a' of the top wall 30 thereof abuts the inner edge 21a of the top wall 21 of housing section 4a and is coplanar therewith, to form an even overall top surface for the camera housing. The main housing section 4a has a vertical front wall 32, having inner edges 32a, 32b and 32c which closely confront or abut corresponding edges 8a, 8b and 8c of the front wall 8 of the other housing section 4b in the fully retracted position of the flash lamp-carrying housing section 4b. The edges 32b and 32c of the main housing section 4a define a cut-out portion 38 which exposes the objective lens window 40 (FIG. 2) in a recessed wall 42 of the main housing section 4a. The cut-out portion 38 is covered by an objective lens covering portion 44 of the front wall 8 of the flash lamp-carrying housing section 4b in the fully retracted position thereof.

The viewfinder section 26 of the main housing section 4a includes front and rear exposed viewfinder lenses 26a-26b (FIGS. 2 and 4), the front lens 26a being covered by the front wall 8 and the rear lens 26b being covered by the vertical rear wall 45 of the flash lamp-carrying housing section 4b when this housing section is in its fully retracted position.

The main housing section 4a has a rear upper wall 46 located above a horizontally elongated film cartridge-receiving compartment 51 (FIG. 4) located behind the objective lens of the camera and designed sealingly to receive a 110 film cartridge. The opening 50 is covered by a door 52 which is pivotally mounted and locked in the conventional manner of doors found in cameras which receive 110 film cartridges, which are narrow elongated cartridges. The door 52 has the conventional cartridge viewing window 53 so that the film frame number on a film cartridge is visible. The door lock is released by downward movement of a spring biased button 54 exposed in a recessed rear wall portion 56 of the main housing section 4a when the flash lamp-carrying housing section is in its fully extended position.

The upper rear wall 46 of the main housing section 4a has indicia 56a and 56b respectively representing desired bright sun and flash or dull light conditions of operation. It also has an exposed indicator light 59 which is energized when the capacitor 10 (FIG. 7) is fully charged. Mounted for sliding movement beneath this indicia is a slide member 58 which can be aligned with either the bright sun indicia 56a or the flash or dull light indicia 56b. In the latter condition of the slide member 58, the switch 7 (FIG. 7) controlled by the slide member 58 is closed and when the slide member 58 is opposite the bright sun indicia 56a, the switch 7 is opened.

The upper rear wall 46 merges with a recessed rear wall portion 60 which carries the rear viewfinder lens 26b. The rear wall 45 of the flash lamp-carrying housing section 4b has an inner edge 45a which abuts a corresponding confronting inner edge 46a of the upper rear wall 46 of the main housing section 4a when these housing sections are in their fully retracted positions. The rear wall 45 then covers the rear viewfinder lens 26b, as previously indicated.

The rear wall 45 of the flash lamp-carrying housing section 4b has a door lock release cover portion 63 which covers over the door lock release button 54 when the housing sections 4a and 4b are in their fully retracted positions, so that the door 52 will not be inadvertently opened when the camera is being held in a pocket or handbag.

Figure 2:
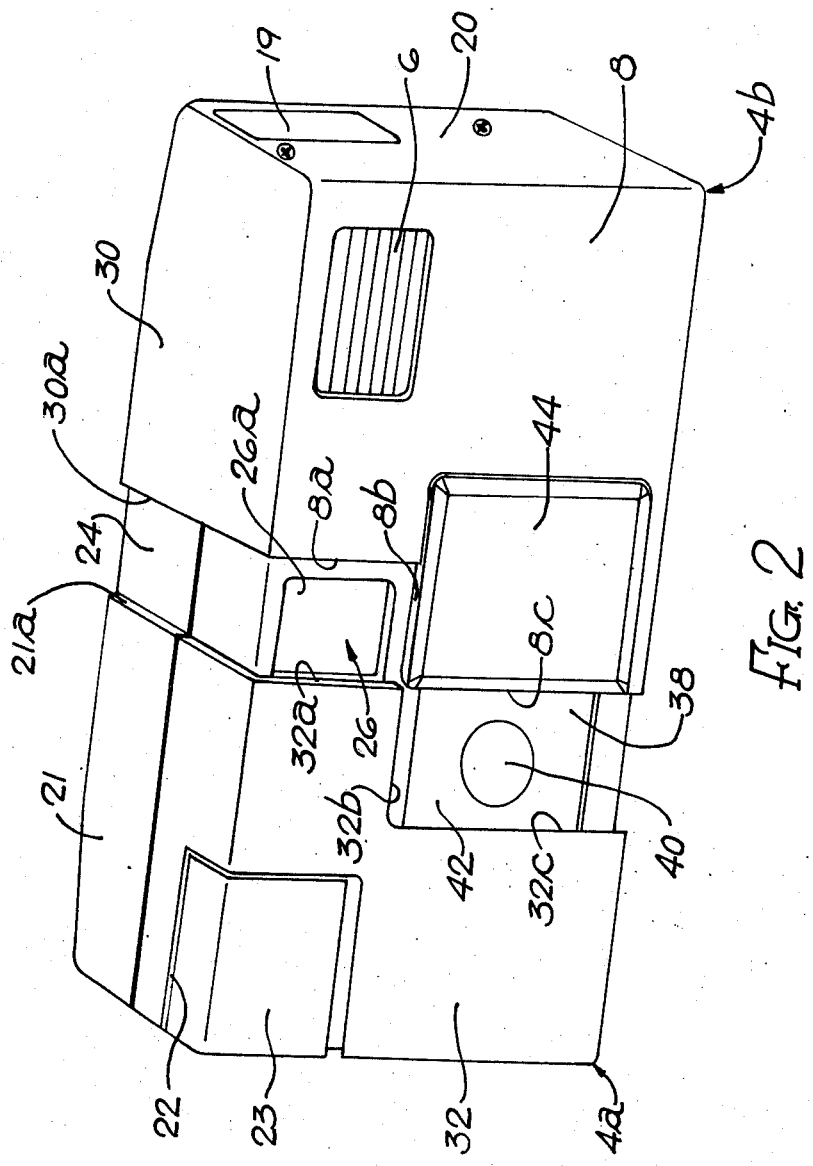
FIG. 2 is a perspective view of the front of the retractable camera shown in FIG. 1, when the housing sections thereof are in their extended, picture-taking positions.
Figure 3:
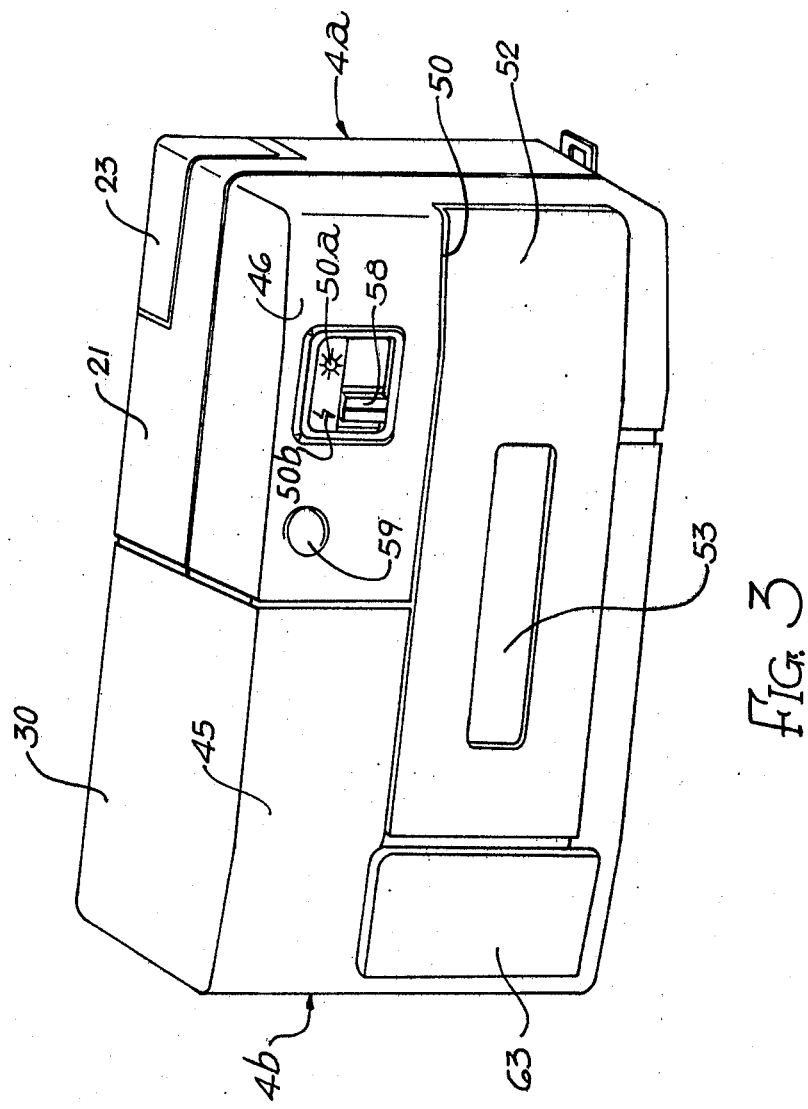
FIG. 3 is a perspective view of the rear of the retractable camera of FIGS. 1 and 2 when the housing sections thereof are in their retracted positions.
Figure 4:
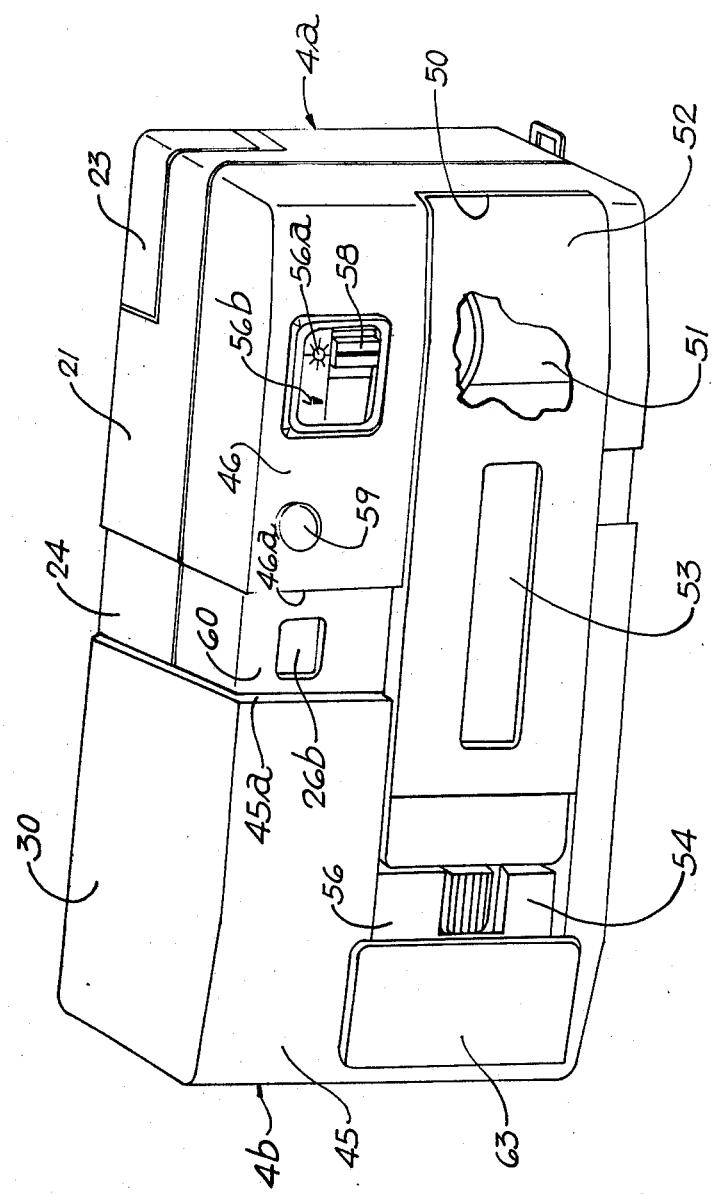
FIG. 4 is a perspective view of the rear of the retractable camera of FIGS. 1-3 when the housing sections are in their extended, picture-taking positions.

The relative positions of the objective lens window 40, viewfinder portion 26, flash lamp and diffuser 5-6, battery compartment and film cartridge-receiving compartment 51 of the camera 2 are related in such a way that the camera 2 has a maximum compactness for permitting the camera to be readily carried in a shirt or coat pocket or in a handbag, in contrast to 110 film cartridge-receiving cameras with built-in electronic flash lamps heretofore made. Contributing most to this result is the fact that the camera 2 is arranged with the viewfinder and flash lamp sections positioned in vertically spaced relation to and preferably in vertical alignment with or at least near an end of the film cartridge-receiving compartment 51. (In conventional cameras which receive 110 film cartridges, as previously indicated, the viewfinder and built-in electronic flash lamp portions are fixedly located and in horizontal alignment with the film cartridge-receiving compartment, which results in a camera with an extremely long horizontally elongated profile.) In the present camera, the spacing between the flash lamp light-diffusing panel 6 mounted behind the same slightly overlap the upward and forward extensions of the inner margins of the film cartridge-receiving compartment, and initially the distance between the flash lamp reflector 6 and the objective lens window 40 is relatively short (e.g. $1\frac{7}{8}$"). (This spacing can sometimes produce "pink eye" effects, as previously described.) However, when the flash lamp-carrying housing 4b is moved to its fully extended position, where the door lock release button 54, viewfinder lenses 26a and 26b and objective lens window 40 are fully uncovered, as shown in FIGS. 2 and 4, the light diffusing panel 6 of the flash lamp is spaced 2⅝", a distance from the objective lens 40 which cannot produce any appreciable "pink eye" effects.

One important feature of the invention is the automatic disconnection of the battery 12 from the capacitor 10 when the housing sections 4a and 4b are in their retracted positions, to which the camera user would normally move the same when the camera is not in use. Thus, if he had left the slide member 58 in the position opposite the flash or dull light indicating indicia 56b (referred to in the claims as the flash "on" position thereof), the switch 9 opens to disconnect the battery 12 from the capacitor 10 when the housing sections are in their retracted positions. To this end, as shown in FIGS. 5 and 6, the switch 9 may comprise a leaf spring contact 9a supported from the circuit board 16, which leaf spring inclines outwardly and upwardly in a direction away from the adjacent end margin of the main housing section 4a. The flash lamp-carrying housing section 4b has a stationary rigid contact member 9b with a depending end portion which is out of engagement with the upper surface of the leaf spring contact 9a when the housing sections 4a and 4b are in their fully retracted positions and engages the same when these housing sections are in their relative fully extended positions.

Figure 8:
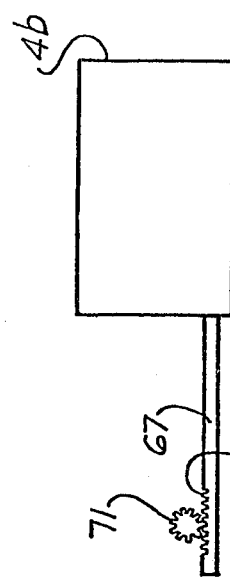
FIG. 8 is a diagrammatic view showing an extension of the flash lamp-carrying housing section of the camera forming a rack engaging a film winding gear projecting into the film cartridge-receiving compartment of the main housing section of the camera.

As previously indicated, the movement of the housing sections between relative fully retracted and extended positions most advantageously effects film winding, shutter cocking, and film aperture sensing finger removal operations (the sensing fingers entry into such an aperture terminating a film winding operation) commonly found in still cameras of the type being described. Accordingly, as shown in FIG. 8, the flash lamp-carrying housing section 4b may have one or more operating arms or portions like arm 67 which perform these operations as the housing sections 4a and 4b are moved between their retracted and extended positions. FIG. 8 shows that the operating arm 67 has a rack portion 69 meshing with a film winding gear 71 which projects into the film cartridge-receiving compartment 51 to engage a corresponding gear on the film cartridge inserted therein. The film winding gear 71 is preferably rotated in its film winding direction when the flash lamp-carrying housing sections are moved to their fully extended positions, as in the case of the reciprocating viewfinder-carrying section disclosed in said U.S. Pat. No. 4,032,940. Thus, while all of the details and connections between the parts carried by the housing section 4a and 4b are not shown in the drawings, these parts can be similar to many of the operating parts and connections thereof disclosed in this patent.

The present invention has thus provided an extremely compact and easy to use camera, the compactness advantages being most pronounced for a camera of the type having a built-in electronic flash lamp system therein.

It should be understood that numerous modifications may be made in the most preferred form of the invention shown in the drawings and just described without deviating from the broader aspects of the invention. For example, while the most important aspect of the invention applies to retractable cameras, the unique relationship of the camera parts used in the present invention in a camera adapted to receive 110 film cartridges is applicable to such cameras where the housing does not have reciprocable housing sections, although such a camera would not be as compact or as easy to use as the camera of the invention described. Additionally, while the most important application of the invention is in retractable cameras where an electronic flash lamp is supported on a housing section reciprocable upon the housing section containing the objective lens and film cartridge-receiving compartment, the aspect of the invention where the charge circuit of an electronic flash lamp is de-energized when the reciprocable sections of the housing are in their fully retracted inoperative positions is applicable to any reciprocable camera used with an electronic flash lamp. Thus, this feature is applicable to the type of retractable camera disclosed in said U.S. Pat. No. 4,032,940 where the viewfinder is located in one reciprocable housing section and the objective lens and film cartridge-receiving compartment are mounted on the main housing section.

I claim:

1. A still camera adapted to receive 110 film cartridges, said camera comprising: a housing which, when held in a normal picture-taking position, presents a relatively thin horizontal profile in a horizontal front to rear direction and has front and rear vertical profiles of much greater area than said horizontal profile, said housing comprising a pair of horizontally spaced housing sections to be grasped by opposite hands of the user during a picture-taking operation and mounted for horizontal reciprocating movement between relatively retracted and extended positions in a direction parallel to the front and rear vertical places of the camera housing, one of said housing sections including a horizontally elongated film cartridge-receiving compartment opening onto the rear thereof in alignment with the film cartridge-receiving compartment behind the same, the other housing section being a built-in flash lamp-carrying housing section forming what appears to be a horizontal extension of one end of said main housing section in the retracted position thereof, a viewfinder on said one housing section in vertical spaced relation to the film cartridge-receiving compartment and said flash lamp-carrying housing section including an electronic flash lamp with a front diffuser arranged to direct light forwardly of the camera housing when the camera is held in said normal picture-taking position, at least a part of said diffuser being within the vertical extension of the inner-end margins of said film cartridge-receiving compartment when said housing sections are in their relative retracted positions and being substantially spaced therefrom when said housing sections are in said relative extended positions.

2. In a still camera having a built-in electronic flash lamp, a camera including a housing comprising a main housing section including a film cartridge-receiving compartment and film winding means communicating with said compartment for advancing the film in a cartridge inserted into said compartment, said main housing section having a front wall having an objective lens window exposing an objective lens in front of said film cartridge-receiving compartment, and another housing section forming an extension at one end margin of said main housing section in a horizontal direction parallel to said front wall and mounted for movement on said main housing section in a horizontal direction parallel to said front wall between a retracted position where it is adjacent said end margin of said main housing section and provides an overall relatively compact camera assembly and an o-erative extended position where it extends norizontally substantially beyond said end margin of said main housing section where the camera is in a picture-taking position, the two housing sections being grasped by opposite hands during such a picture taking operation, means responsive to the reciprocation of said housing sections between relative retracted and extended positions for operating said film winding means, one of said housing sections including an electronic flash lamp which directs light forwardly of the camera when energized, and an energizing circuit for said flash lamp including a capacitor which is to be discharged through the lamp when a picture is taken, a battery for initially charging and maintaining a full charge on said capacitor, and circuit connections between said battery and capacitor, the improvement comprising the combination of a manually operable flash on-off control with first switch means on one of said housing sections and forming part of said circuit connections which prepares said battery for connection to said capacitor and disconnects said battery from said capacitor when said control is respectively in "on" and "off" positions, and second switch means responsive to the retracted position of said housing sections for decoupling said battery from said capacitor independently of the position of said flash on-off control and responsive to the extended position of said housing section for coupling said battery to said capacitor when the manual on-off control is in its "on" position.

3. The camera of claim 1 or 2 where said flash lamp including housing section extends substantially the entire vertical extent of the other housing section so that it appears to be an integral part thereof when in said retracted position.

4. The camera of claim 1 or 2 wherein said housing section including said flash lamp includes a compartment for receiving said battery.

5. The camera of claim 1 or 2 wherein said energizing circuit except for the battery is located on said housing section which does not include the flash lamp.

6. The camera of claim 1 or 2 wherein said housing section which does not include the flash lamp includes a viewfinder, and said flash lamp including housing section includes walls which cover over any exposed surface of said objective lens and viewfinder when the flash lamp support is in its fully retracted position and exposes the same when said flash lamp support is in its fully extended position.

7. The camera of claim 1 wherein said flash lamp-carrying housing section includes an energizing circuit for said flash lamp including a capacitor which is to be discharged through the lamp when a picture is taken, a battery for initially charging and maintaining a full charge on said capacitor, and circuit connections between said battery and capacitor, said housing including a manually operable flash on-off control with switch means forming part of said circuit connections which prepares said battery for connection to said capacitor and disconnects said battery from said capacitor when said control is respectively in its "on" and "off" positions, said circuit connections further including switch means responsive to the retracted position of said flash lamp-carrying housing section for decoupling said battery from said capacitor independently of the position of said flash on-off control and responsive to the extended position of said flash lamp-carrying housing section coupling said battery to said capacitor when said flash lamp support is in said extended position and the manual on-off control is in its "on" position.

* * * * *